Aug. 29, 1967     M. G. SCHAEFFER     3,339,130
CAPACITOR MEANS
Original Filed July 2, 1964     2 Sheets-Sheet 1
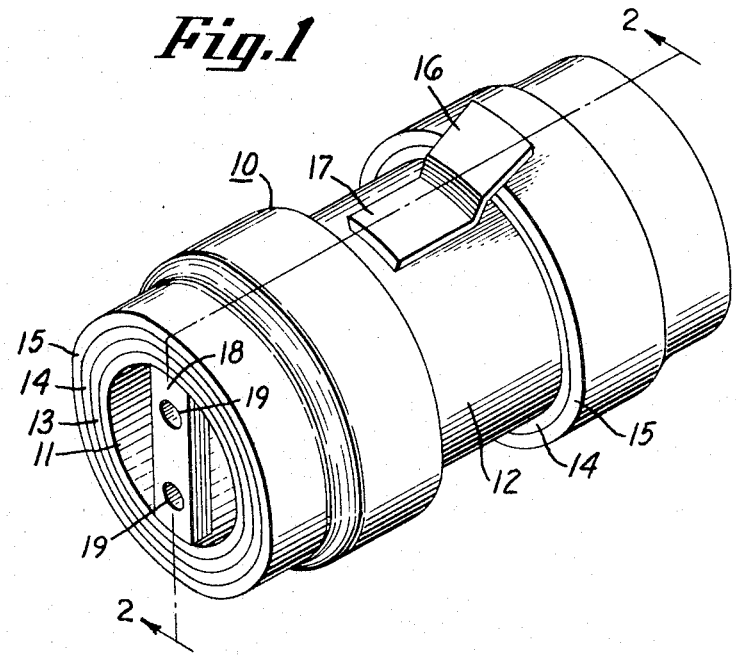
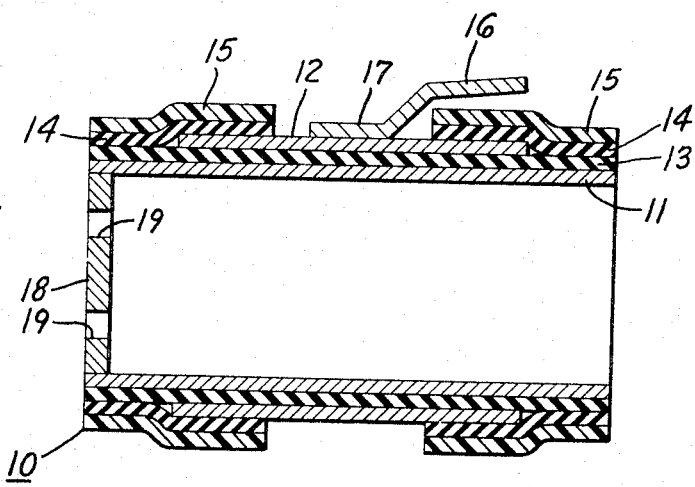
INVENTOR.
MARVIN G. SCHAEFFER
BY
ATTORNEY Aug. 29, 1967  M. G. SCHAEFFER  3,339,130
CAPACITOR MEANS
Original Filed July 2, 1964  2 Sheets-Sheet 2
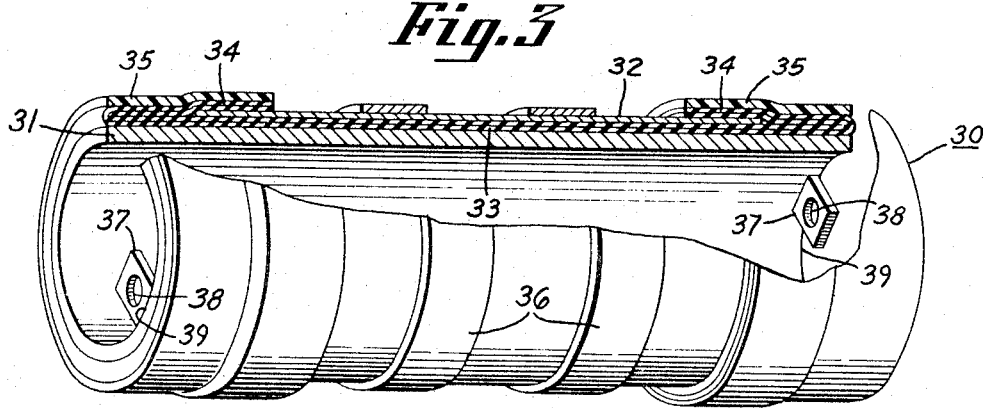
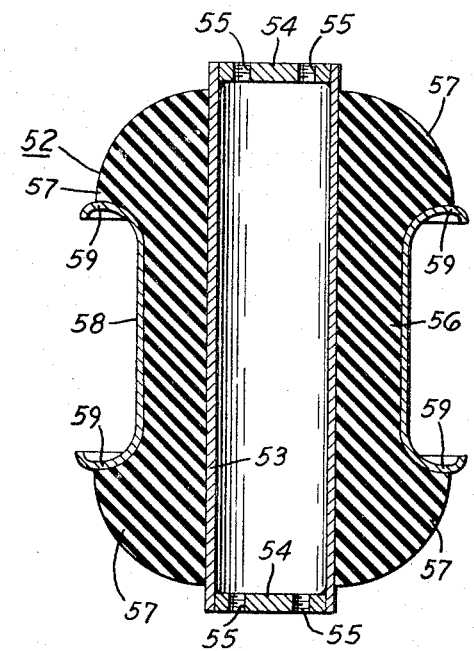
INVENTOR.
MARVIN G. SCHAEFFER
BY
*Albert H. Reuther*
ATTORNEY _United States Patent Office_

3,339,130
Patented Aug. 29, 1967

3,339,130
CAPACITOR MEANS
Marvin G. Schaeffer, Farmington, Mich., assignor to General Motors Corporation, Detroit, Mich., a corporation of Delaware
Original application July 2, 1964, Ser. No. 379,957, now Patent No. 3,262,031, dated July 19, 1966. Divided and this application Feb. 4, 1966, Ser. No. 525,212
4 Claims. (Cl. 317—258)

This is a division of copending application S.N. 379,957—Schaeffer filed July 2, 1964, now Patent No. 3,262,031, and belong to the assignee of the present invention.

This invention relates to capacitor means and, more particularly, to structural arrangement and combination of materials for minimum cost as well as unique component characteristics.

On certain industrial capacitors it has been known to have a vacuum capacitor or air gap dielectric at considerable cost. An object of this invention is to provide improved capacitor means utilizing solid elastomeric dielectric sleeving and metal portions costing one-tenth or less of the cost of vacuum type capacitor means with air gap dielectric.

Another object of this invention is to provide a capacitor means structure including an innner tubular or pipe member having terminal mounting provision internally thereof. The member is surrounded concentrically first by a layering of dielectric rubbery material and then by an outer metal portion centrally exposed for lead connection. The outer metal portion is sealed with insulating material also including further dielectric rubbery material.

Another object of this invention is to provide a capacitor means structure including in combination an inner tubular or pipe member of copper having an outer diameter in a range between one and seven inches with terminal mounting provision internally thereof. The member is surrounded concentrically first by a layering of dielectric rubbery material for substantially full length thereof and then by an outer metal portion of less than full length centrally exposed. The outer metal portion is sealed at opposite ends with insulating material including polyester resin overlay thereon.

A further object of this invention is to provide a capacitor means structure including in combination an inner tubular or pipe member having terminal mounting provision internally thereof and surrounded concentrically first by a layering of dielectric rubbery material and then by an outer metal portion centrally exposed. The outer metal portion of the combination is held by annular clamping means as well as being sealed at opposite ends with insulating material including polyester resin overlay thereon.

Another object of this invention is to provide a radio frequency capacitor means with high voltage and current ratings as well as very desirable power loss and power factor characteristics and dielectric constant of substantially 10. These characteristics are obtained from concentrically arranged inner and outer tubing or annularly disposed plate means having solid dielectric of silicone-rubber-type material therebetween. There are clamping means secured centrally to the outer tubing means or plate means also having braces extending angularly therefrom for mounting of metal corona ring means concentrically and adjacent to opposite ends thereof subject to connection-mounting provision carried by the tubing and/or plate means.

Further objects and advantages will become apparent from the following description, reference being had to the accompanying drawings wherein preferred embodiments of the present invention are clearly shown.

In the drawings:
FIGURE 1 is a perspective view of capacitor means having features in accordance with the present invention.
FIGURE 2 is a longitudinally sectioned view of the capacitor means of FIGURE 1.
FIGURE 3 is a perspective view of a modification of capacitor means having features similar to those of FIGURES 1 and 2.
FIGURE 4 is a sectioned elevational view showing molded dielectric rubbery material on capacitor means.

FIGURES 1 and 2 illustrate capacitor means generally indicated by numeral 10 and having features in accordance with the present invention. The capacitor means 10 includes a first or inner tubular pipe-like member 11 as well as a second or outer annular metal member 12 extending concentrically of each other. The inner or first member 11 is greater in length than the second member 12. For purposes of illustration, it is noted that the first or inner member 11 is a copper pipe having a five inch internal diameter and extending substantially nine inches longitudinally as a grounding plate. The second or outer metal mmeber 12 is also made of copper which for purposes of illustration has a width of six inches, circumference of substantially nineteen inches and a thickness of fifteen thousandths of an inch. Located concentrically between the first and second members 11–12 there is an intermediate or dielectric portion 13 of solid silicone-rubber-type insulating material extending for substantially the same length or for example nine inches as the length of the first or inner member 11 and having an annular peripheral circumference of substantially nineteen inches. Also as can be seen in views of FIGURES 1 and 2, there is a seal of further dielectric rubber material indicated as sleeving or band portions 14 at each of opposite ends. This sleeving 14 as well as the intermediate portion 13 has a composition of material fully disclosed in Patent 2,922,865—Schattler et al. issued Jan. 26, 1960, and belonging to the assignee of the present invention. Details of the specific materials and examples of compositions given by this patent are hereby incorporated by reference thereto such that repeating details thereof is being left as the subject of this additional patent disclosure. It is to be noted however, that each of opposite ends of sleeving 14 illustrated in views of FIGURES 1 and 2 of the drawings of the present disclosure can further be provided with a polyester resin tape wrapping 15. Such tape wrapping 15 as commercially available is known by a trade name "Mylar" which is a polyester film of polyethylene terepthalate resin.

A lead connection or terminal means 16 is secured by suitable sweat soldering at one end 17 thereof directly to an exposed central location of the annular plate or tubing member 12. This terminal connection 16–17 can also be made of copper as a strap having a thickness of ten-thousandths of an inch and a width of four inches as well as a suitable length such as ten inches.

As also illustrated in view of FIGURES 1 and 2, further terminal-mounting means such as a brass bar portion 18 secured at opposite ends thereof to inner periphery of the first or inner member 11 is provided with mounting openings 19. The mounting or bar means 18 as silver soldered at opposite ends and has a length of substantially five inches as well as a width of approximately two inches and a height or depth of substantially one quarter inch. The capacitor means 10 of FIGURES 1 and 2 is adapted to withstand a minimum of thirty-two thousand volts direct current prior to installation of banding or sleeve means 14 having a length of substantially three inches to overlap both the second or outer plate means 12 and the dielectric silicone-rubber-type intermediate portion 13. After installation of the banding or sleeve means 14 the capacitor means is adapted to be tested for leakage with no more than twenty-five thousand volts direct current since possible flashover at this time might damage capacitor components sufficiently to require rebuilding which can be readily accomplished as is evident by the minimum number of components. The resulting capacitor means of the sample dimensions given results in a one thousand mmf. radio-frequency bypass capacitor using the dielectric rubbery intermediate portion 13 having a dielectric constant in the neighborhood of 10 and also very desirable power loss and power factor characteristics.

FIGURE 3 illustrates a capacitor means generally indicated by numeral 30. This capacitor means 30 includes a first or inner tubular portion 31 as well as a second or outer metal plate portion 32 concentrically arranged and separated by an intermediate solid dielectric portion 33 of silicone-rubber-type insulating material noted earlier for the embodiment of FIGURES 1 and 2. Reference can be made again to patent 2,922,865—Schattler et al. dated Jan. 26, 1960, for specific details as to this dielectric material. In the embodiment of FIGURE 3, the first or inner tubular member 31 is made of copper having a thickness of one hundred thirty-four thousandths of an inch in a wall thereof as well as a length of substantially nine inches and an outer diameter of substantially six and one eighths inches. The second or outer plate portion 32 has a width of only six inches and is thus shorter than the nine inch length of the first tubular portion 31. The second or outer portion 32 is substantially sixteen thousandths of an inch thick with a circumference of substantially twenty inches for copper thereof. The dielectric intermediate portion 33 in the embodiment of FIGURE 3 has opposite ends 34 thereof folded back over opposite periphery of the second metal portion 32 at both ends. A polyester resin or Mylar tape wrapping 35 is provided to overlay each of the opposite end areas including the folded back portions 34. An example of the size of the intermediate portion 33 including the folded back portions 34 thereof is given as thirty thousandths of an inch thickness by fifteen inch width and forty inch circumference approximately.

In the embodiment of FIGURE 3, the second metal portion 32 is a copper plate having a thickness of substantially sixteen thousandths of an inch, a width of six inches which is less than the length of nine inches for the first or inner tubing portion 31 and finally a circumference of twenty inches for the second portion 32. A pair of stainless steel circular or annular clamping means 36 can be provided peripherally in a centrally exposed location of the second or outer plate portion 32. Suitable terminal mounting can be provided therewith and at either or both of opposite ends a terminal means 37 having a tapped aperture 38 centrally thereof can be silver-soldered in place along a semi-arcuate edging 39 thereof. This terminal means 37 can have a size of one inch by one inch by one fourth inch for example and can be made of copper material. The capacitor means illustrated in FIGURE 3 is adapted to withstand forty thousand volts with no more than five micro-amperes leakage and capable of functioning as a one thousand mmf radio-frequency feed-through capacitor.

FIGURE 4 shows a capacitor means generally indicated by numeral 52 having a silver-plated cylindrical copper core or inner member 53, with transverse bar means 54 having tapped mounting holes 55 similar to structure of FIGURES 1 and 2. However, in structure of FIGURE 4 there is provided a molded silicone rubber material of the type composition noted earlier and designated by reference numeral 56 with integral outwardly curved and bulging ends 57. Provisions of moldable silicone rubbery dielectric material permits holding in situ an outwardly-flared silver-plated copper outer ring means 58 with opposite annular edging 59 anchoring the ends 57 against axial displacement therebetween. It is to be understood that suitable electrical or terminal connection not shown in FIGURE 4 can be provided in a manner similar to that shown and described previously in this disclosure. The capacitor structure of FIGURE 4 showing molded configuration of rubbery dielectric material is adapted to be suitable for high frequency use at high voltage and high current operation.

While the embodiments of the present invention as herein disclosed constitute preferred forms, it is to be understood that other forms might be adopted.

What is claimed is as follows:

1. A high power capacitor structure comprising, an inner tubular metal plate, an outer tubular metal plate concentrically located about a central portion of said inner plate intermediate the ends thereof and a dielectric insulation including a composition having a proportion of silicone rubber material surrounding the outer surface of said inner plate and being intermediate said inner and outer plates, said dielectric insulation including enlarged end portions at the opposite ends of said inner tubular plate and extending over each end of said outer plate for a predetermined distance to expose an annular portion of the outer plate, said enlarged end portions including a sleeve formed by a separate layer of said dielectric insulation with each sleeve layer being surrounded by a layer of polyester resin tape material.

2. The high power capacitor structure of claim 1 wherein said inner and outer tubular plates are made of copper with an outwardly extending copper terminal strap secured to said outer tubular plate and a mounting bar is secured within one end of said inner tubular plate.

3. The high power capacitor structure of claim 1 wherein said dielectric insulation includes a layer of silicone rubber material and said enlarged end portions are formed by folding the insulation layer at the ends of said inner tubular plate and overlapping each end of said outer tubular plate for said predetermined distance, and a metal clamping ring is provided about the exposed portion of said outer tubular plate.

4. A high power capacitor structure comprising: an inner silver plated copper tubular plate, a solid dielectric body portion having a composition including a proportion of silicone rubber material molded around the inner tubular plate and supporting an outer silver plated copper tubular plate embedded within the dielectric body, said outer tubular plate being concentrically located about a central portion of said inner tube and including lateral extending flared end portions having a portion of each flared end secured to said dielectric body portion.

References Cited

UNITED STATES PATENTS

| 2,719,097 | 9/1955 | Balzers | 317—258 |
| 2,922,865 | 1/1960 | Schattler. | |
| 3,001,267 | 9/1961 | Heibel | 317—242 X |

FOREIGN PATENTS

| 1,000,191 | 10/1951 | France. |
| 589,412 | 6/1947 | Great Britain. |

OTHER REFERENCES

German Printed Application, Gans No. 1,041,159, Published Oct. 16, 1958.

LEWIS H. MYERS, *Primary Examiner.*

E. GOLDBERG, *Assistant Examiner.*